Jan. 21, 1969 E. S. KELSEY ETAL 3,423,683

BINARY RANDOM NUMBER GENERATOR USING SWITCHING TREE AND WIDE-BAND NOISE SOURCE

Filed March 31, 1966 Sheet 1 of 4

INVENTOR
Ernest S. Kelsey
Stuart H. Whitaker
BY
Weir, Marshall, MacRae & Lamb
PATENT AGENT INVENTOR
Ernest S. Kelsey
Stuart A. Whitaker
BY
Weir, Marshall, McRae & Lamb
PATENT AGENT

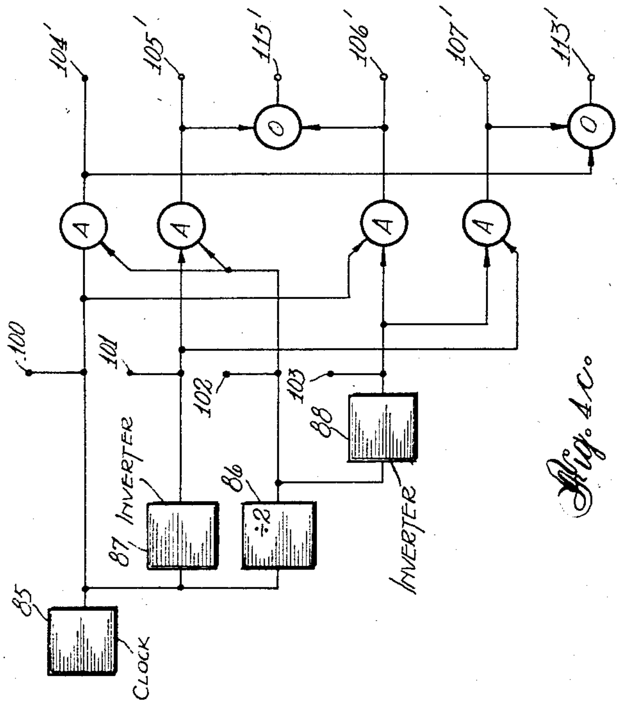
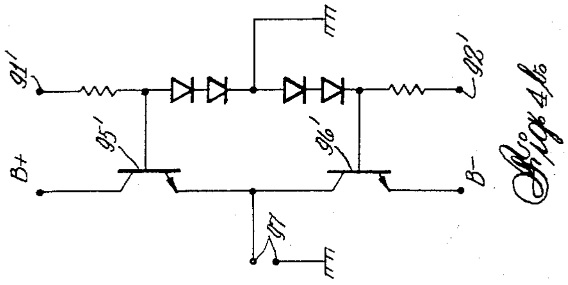
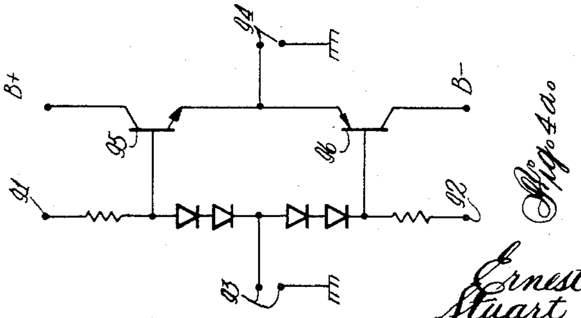
Fig. 4c
Fig. 4b
Fig. 4a
INVENTOR
Ernest S. Kelsey
Stuart H. Whitaker
BY
Weir, Marshall, McRae & Lamb
PATENT AGENT INVENTOR
Ernest S. Kelsey
Stuart A. Whitaker
BY
Weir, Marshall, McRae & Lamb
PATENT AGENT United States Patent Office 3,423,683

Patented Jan. 21, 1969

3,423,683

BINARY RANDOM NUMBER GENERATOR USING SWITCHING TREE AND WIDE-BAND NOISE SOURCE

Ernest S. Kelsey and Stuart H. Whitaker, Ottawa, Ontario, Canada, assignors to Northern Electric Company Limited, Montreal, Quebec, Canada Filed Mar. 31, 1966, Ser. No. 539,180
U.S. Cl. 328—61 3 Claims
Int. Cl. H03k 3/64

ABSTRACT OF THE DISCLOSURE

A wide-band noise source which is sampled at intervals and the instantaneous amplitude stored in capacitor storage. The stored voltages are compared two at a time and a binary one generated when a preassigned one of the stored voltages is positive with respect to the other and a binary zero in the opposite case.

This invention relates to a random number generator and, in particular, to a generator of random binary numbers which may be produced at a predetermined frequency.

Examples of the uses of sequences of random numbers are to be found both in mathematical computation and in the testing of telecommunication systems. Certain mathematical calculations, such as the inversion of matrices, can be carried out by "Monte Carol" methods which require the use of a series of random numbers. A sequence of random numbers can be used in the testing of communications systems to simulate the fluctuating load imposed on such systems.

Known methods of generating a sequence of random numbers or, more commonly, a sequence of numbers approximating to random numbers termed pseudo-random numbers, include the use of a mathematical routine in a digital computer. This method has the disadvantages of being relatively slow, preempting computer time which could be used for the calculation per se, and generating numbers which are not truly random but repeat after a predictable cycle. A second known method is to supply a sequence of random numbers to a computer taken from tables to be found in standard statistical text-books. Such numbers are normally given in the decimal system and require conversion to the binary system before use in the computer. Both these methods require a relatively large computer storage capacity.

A third known method of producing a sequence of random numbers is based on the use of some randomly occurring physical phenomenon such as shot noise in an electron stream in a vacuum tube or noise fluctuations occurring in an ionized gaseous discharge. Known random number generators using such physical noise sources obtain a randomly varying voltage signal and detect the occurrence of peaks of this signal exceeding a predetermined amplitude. These detected peaks occur randomly in time and from them may be derived a pulse train with randomly varying spacing. It is possible by means of timing measurements to translate such a pulse train into a series of random numbers with each number representing a time interval between successive pulses. The random numbers produced by such a system occur at irregular intervals which is not desirable for use in computing application.

It is an object of this invention to provide a novel random number generator.

It is a further object of this invention to provide a novel random number generator in which the random numbers are produced at a preassigned frequency.

It is a further object of this invention to provide a novel binary random number generator in which the series of random binary digits are produced at a preassigned frequency.

Briefly, the random number generator of this invention comprises a source of randomly fluctuating signal such as a wide-band noise source. This signal is sampled at intervals and the value of a parameter, typically the instantaneous amplitude, of the sampled signal is stored in suitable storage means. The stored values representing the parameter are then supplied in pairs to a comparison circuit to determine whether one of the values is positive or negative with respect to the other. A binary signal generator responsive to the comparison circuit produces a binary one when a preassigned one of the values is positive with respect to the other and a binary zero in the opposite case. Since there is an equal probability for successive differences to be positive or negative, a random sequence of binary ones and zeros is produced. If required, the sequence of random binary numbers may be converted to a sequence of random decimal numbers by a conventional binary to decimal converter.

The invention will become apparent from the following description of specific embodiments of the invention, taken in conjunction with the accompanying drawings, in which:

FIGURES 4A, 4B and 4C are particular components useful in the systems of FIGURES 3, and 5

Figure 1:
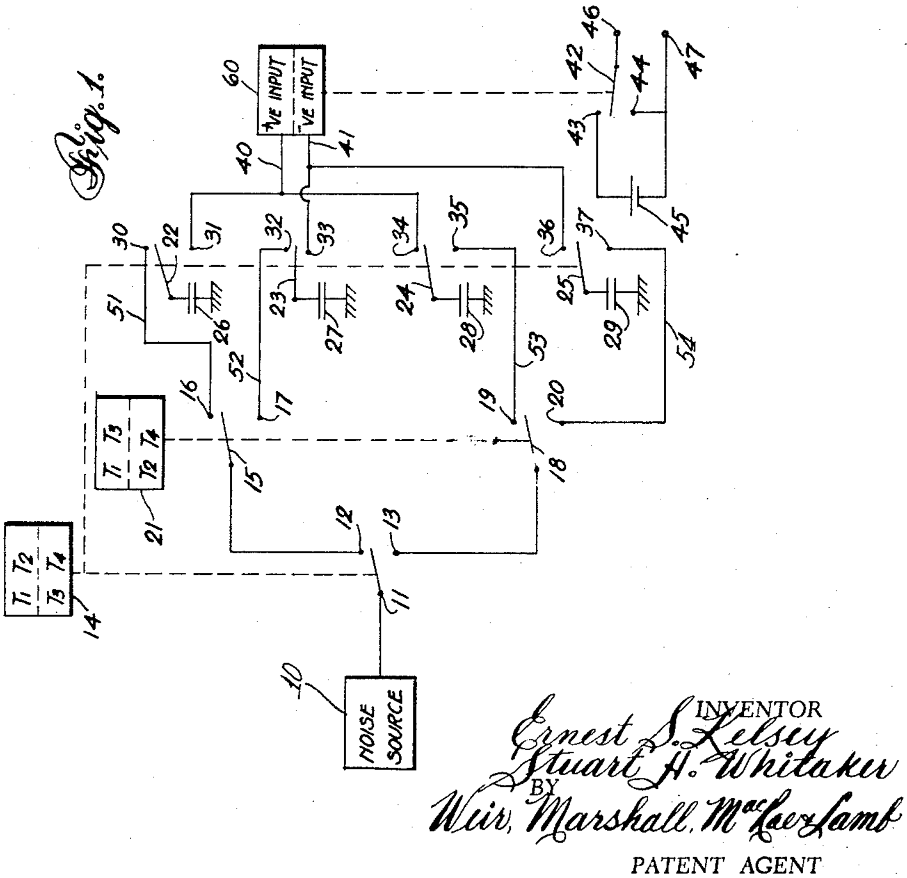
FIGURE 1 is a schematic diagram showing the basic principles of the invention.

Referring now to FIGURE 1, there is shown a wide-band noise source 10 which produces a randomly fluctuating voltage waveform. Noise source 10 may be a gas discharge tube having a high value of ionization noise or may be any other conventional form of wide-band random noise generator. Noise source 10 is connected to a single-pole double-throw switch 11 and through the switch to a terminal 12 in one position and to a terminal 13 in the other position. Terminal 12 is in turn connected to a single-pole double-throw switch 15 and through switch 15 to a terminal 16 in one position and to a terminal 17 in the other position. Terminal 13 is similarly connected to a single-pole double-throw switch 18 and through switch 18 to a terminal 19 and to a terminal 20. The position of switch 11 is controlled by actuating unit 14 and the positions of switches 15 and 18 are controlled by actuating unit 21.

The system of FIGURE 1 has a repetitive operating cycle divided into four intervals of equal duration denoted as T1, T2, T3 and T4. The end points of each time interval are denoted by lower case letters $t_1$, $t_2$, $t_3$ and $t_4$ as is shown in the abscissae of the graphs in FIGURE 2. During time intervals T1 and T2 actuating unit 14 maintains switch 11 in the position completing a conducting path to terminal 12. During time intervals T3 and T4 actuating unit 14 maintains switch 11 in the position completing a conducting path to terminal 13. The time sequence of operation of actuating unit 14 is indicated in FIGURE 1 by the legend T1, T2 in the upper portion of actuating unit 14 and the legend T3, T4 in the lower portion of actuating unit 14.

The operating sequence of actuating unit 21 is also shown in the legend in FIGURE 1. That is, during operating intervals T1 and T3 switch 15 completes a conducting path to terminal 16 and switch 18 completes a conducting path to terminal 19. During operating intervals T2 and T4 switch 15 completes a conducting path to terminal 17 and switch 18 completes a conducting path to terminal 20.

Thus, it will be seen that switches 11, 15 and 18 function as a sampling circuit or switching tree repetitively connecting noise source 10 to terminals 16, 17, 19 and 20 during intervals T1, T2, T3 and T4 respectively. To store the sampled values of the fluctuating noise voltage four capacitors 26, 27, 28 and 29 are provided each having one plate connected to single-pole double-throw switches 22, 23, 24 and 25 respectively. The other plate of each capacitor is grounded. Switches 22, 23, 24 and 25 selectively connect with the associated pair of an array of terminal pairs 30, 31; 32, 33; 34, 35 and 36, 37, respectively. Terminals 30, 32, 35 and 37 are connected to terminals 16, 17, 19 and 20, by conductors 51, 52, 53 and 54, respectively.

Switches 22, 23, 24 and 25 are controlled by actuating unit 14, the time sequence of operation of which has already been described. That is, during time intervals T1 and T2 capacitors 26, 27, 28 and 29 are connected to terminals 30, 32, 34 and 36, respectively. During time intervals T3 and T4 the capacitors 26–29 are connected to terminals 31, 33, 35 and 37 respectively. This switching sequence results in the instantaneous value of the noise voltage which appears at terminal 16 at time $t_1$ being stored in capacitor 26. Similarly the instantaneous value of the sampled noise voltages appearing at terminals 17, 19 and 20 at times $t_2$, $t_3$ and $t_4$, respectively is stored in capacitors 27, 28 and 29, respectively. The switching sequence also results in the voltages stored on capacitors 26 and 27 being available at terminals 31 and 33 during time intervals T3 and T4 and the voltages stored on capacitors 28 and 29 being available at terminals 34 and 36 during time intervals T1 and T2.

While it has been assumed that the voltage stored on capacitors 26 through 29 is the instantaneous value assumed by the noise voltage at times $t_1$ through $t_4$ it will be clear that the unavoidable presence of resistance in physical circuits will cause an integrating action. This is not undesirable and, in fact, the capacitor storage circuits may be designed to operate as integrating circuits provided the time constant of integration does not substantially exceed the time intervals of the sampling system. This integrating action will be termed partially integrating the noise signal.

The remaining portions of the system of FIGURE 1 act to compare pairs of the voltages available at terminals 31, 33, 34 and 36 to produce a binary output signal which is one if the difference between the voltages in a pair is positive and zero if the difference is negative. For this purpose there is provided a single-pole double-throw switch 42 with associated terminals 43 and 44 and its actuating unit 60. Actuating unit 60 has a first input conductor 40 connected in parallel to terminals 31 and 34 and a second input conductor 41 connected in parallel to terminals 33 and 36. An output terminal 46 is connected to the pole of switch 42 and a second output terminal 47 is connected to terminal 44. A suitable source of D.C. potential, indicated schematically as battery 45 is connected across terminals 43 and 44.

Actuating unit 60 functions as an amplitude sensitive detector or comparison circuit to compare the relative amplitudes of the voltages appearing on conductors 40 and 41. When the voltage on conductor 40 exceeds the voltage on conductor 41, that is conductor 40 is positive with respect to conductor 41 switch 42 is actuated to contact terminal 43. When the opposite situation obtains, switch 42 is actuated to contact terminal 44. This action may be viewed as the comparison circuit producing a first output signal when the voltage on conductor 40 is positive with respect to the voltage on conductor 41 and producing a second output signal when the voltage on conductor 40 is negative with respect to the voltage on conductor 41. Switch 42 functions as a binary signal generator responsive to the first output signal to produce a binary one and responsive to the second output signal to produce a binary zero.

Figure 2:
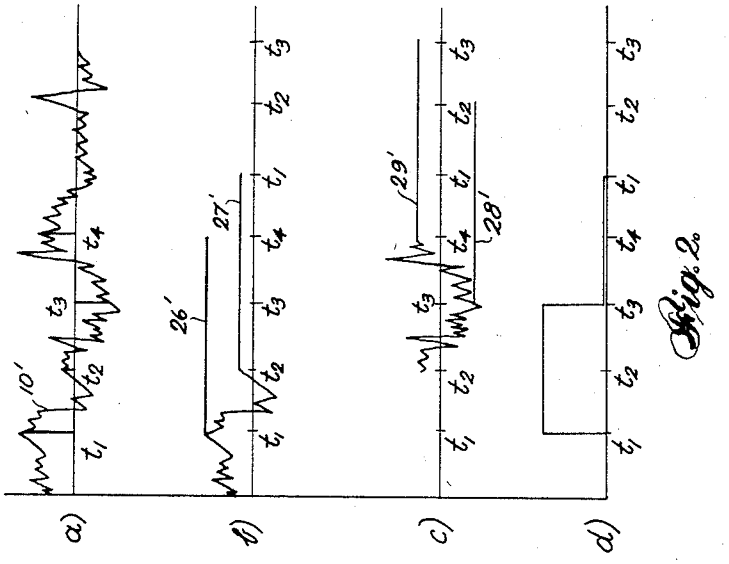
FIGURE 2 is a representation of waveforms occurring in the operation of the system shown in FIGURE 1.

The operation of the basic random number generator of FIGURE 1 will now be reviewed in conjunction with the waveforms shown in FIGURE 2. Noise source 10 produces a randomly fluctuating voltage waveform 10′ shown in waveform *a*. Due to the sequence of operation of the switches controlled by actuating units 14 and 21 the noise voltage is first fed to capacitor 26 during interval T1. At time $t_1$ the noise voltage is switched to capacitor 27 leaving the voltage on capacitor 26 at the value attained at $t_1$. Similarly at time $t_2$ the noise voltage is switched to capacitor 28 and, at time $t_3$, to capacitor 29. The resulting voltage waveforms appearing at the nongrounded terminals of the capacitors are shown in waveforms *b* and *c* of FIGURE 2 identified as 26′ through 29′ respectively corresponding to capacitors 26 through 29, respectively. That is, curve 26′ shows that the noise voltage is applied to capacitor 26 during interval T1. At time $t_1$ the applied noise voltage is switched out of contact with capacitor 26 which retains the instantaneous voltage of the noise waveform at time $t_1$.

The sampled voltages stored on capacitors 26 and 27 are compared during time intervals T3 and T4 when the capacitors are connected to conductors 40 and 41, respectively. Since waveform 26′ is positive with respect to waveform 27′ actuating unit 60 maintains switch 42 in contact with terminal 43 and hence a positive signal, representing a binary digit one appears across output terminals 46 and 47 as shown in waveform *d* of FIGURE 2. The sampled voltages stored on capacitors 28 and 29 are compared during the time intervals T1 and T2 following their sampling when the capacitors are connected to conductors 40 and 41, respectively. Since waveform 28′ is negative with respect to waveform 29′ actuating unit 60 maintains switch 42 in contact with terminal 44 and hence the output signal across terminals 46 and 47 is a binary zero as shown in waveform *d*.

Figure 3:
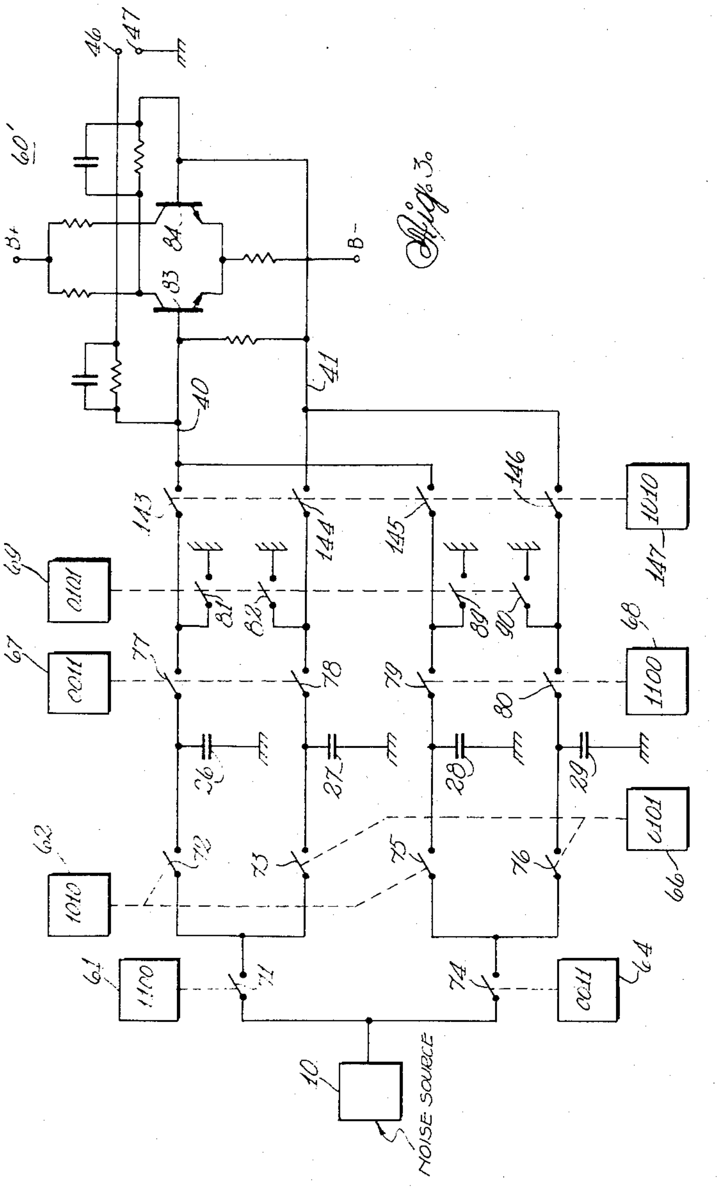
FIGURE 3 is a schematic diagram of one embodiment of the invention.

Referring now to FIGURE 3 there is shown a specific embodiment of this invention utilizing single-pole single-throw switches. Due to the similarity of the system shown in FIGURE 3 to that of FIGURE 1 it is believed that a detailed recitation of each component will be unnecessary.

A wide-band noise source 10 is connected in sequence for equal time intervals to storage capacitors 26 through 29 by a switching tree consisting of switches 71 through 76. Switches 71 and 74 are controlled by actuating units 61 and 64, respectively. Switch pairs 72, 75 and 73, 76 are controlled by actuating units 62 and 66, respectively. As in the system of FIGURE 1 the actuating units operate in a four interval cycle. This cycle is indicated in FIGURE 3 in relation to each actuating unit with the intervals during which the switches are closed being denoted by 1 and the intervals during which the switches are open denoted by 0. For example, actuating unit 61 controls switch 71 so that the switch is closed during time intervals T1 and T2 and open during time intervals T3 and T4.

The sampled noise voltages stored on capacitors 26 through 29 are compared by an amplitude comparison circuit 60′ having input conductors 40 and 41. The sampled voltages to be compared are selected in pairs by a switching tree comprising switches 77 through 80 and switches 143 through 146. Switches 77 and 78 are controlled by an actuating unit 67, switches 79 and 80 are controlled by an actuating unit 68 and switches 143 through 146 by actuating unit 147. It is to be noted that the sequences of operation of actuating units 67, 68, 69 and 147 are the same respectively as those of actuating units 64, 61, 66 and 62. For clarity of drawing these have been shown as separate actuating units but it will be apparent that each pair of corresponding actuating units could be replaced by a single unit.

The amplitude comparison circuit 60' comprises a conventional transistor bistable circuit formed by transistors 83 and 84 cross-connected so that when one transistor is conducting the other is cut-off and vice versa. Conductor 40 is connected to the base of transistor 83 and conductor 41 is connected to the base of transistor 84. Output terminal 46 is connected to the collector of transistor 84 and output terminal 47 is connected to a point of reference potential. When conductor 40 assumes a positive potential with respect to conductor 41 transistor 83 is biased into conduction and transistor 84 is cut-off. This causes output terminal 46 to assume a relatievly high potential, indicating a binary one. When conductor 40 assumes a negative potential with respect to conductor 41, transistor 84 is biased into conduction causing output terminal 46 to assume a relatively low potential, indicating a binary zero.

A pair of switches 81 and 82 are provided to connect capacitors 26 and 27 respectively to ground via switches 77 and 78 respectively during the fourth interval of the cycle. Similarly switches 89 and 90 are provided to connect capacitors 28 and 29 respectively to ground via switches 69 and 80 respectively during the second interval of the cycle. Switches 81, 82, 89 and 90 are controlled by actuating unit 69 which has the same operating sequences as actuating unit 66.

The operation of the overall random number generator of FIGURE 3 will be briefly reviewed. The sampled values of the noise voltage are stored on capacitors 26 through 29 at the end of the first, second, third and fourth intervals of the timing cycle. During the first interval the sampled voltages stored on capacitors 28 and 29 during the preceding cycle are supplied to amplitude comparison circuit 60' to generate as an output a one or a zero according as the voltage on capacitor 28 exceeds or falls short of the voltage on capacitor 29. During the second interval capacitors 28 and 29 are discharged to ground via switches 89 and 90. The closing of switches 89 and 90 during the second interval has no effect on comparison circuit 60' since switches 145 and 146 are open at this time.

During the third interval the sampled voltages stored on capacitors 26 and 27 during the first and second intervals respectively are supplied to amplitude comparison circuit 60'. During the fourth interval capacitors 26 and 27 are discharged to ground via switches 77 and 81, and 78 and 82 without affecting comparison circuit 60'.

In order to generate a sequence of random numbers for use in a computer the random numbers should occur at a frequency of the order of one megacycle. At such a repetition rate the switches 71 through 82, 89, 90 and 143 through 146 of FIGURE 3 cannot be mechanical switches. A suitable form of electronic switch to replace switches 71 through 80 and 143 through 146 is shown in FIGURE 4A. This switch is of the type disclosed in Canadian Patent 672,929, issued Oct. 22, 1963 to Rywak.

The operation of this switch, briefly, is as follows. When gating terminals 91 and 92 are energized to positive and negative potentials respectively, transistors 95 and 96 are rendered conductive and the signal appearing at input terminals 93 is coupled to output terminals 94. When gating terminals 91 and 92 are not energized output terminals 94 are isolated from input terminals 93. A similar form of electronic switch is shown in FIGURE 4B suitable for replacing switches 81 and 82 in FIGURE 3. In this switch, when gating terminals 91' and 92' are energized to positive and negative potentials respectively, transistors 95' and 96' are rendered conductive and input terminal 97 is coupled to ground. For a more complete explanation of the operation of these switches reference may be made to the above-identified patent to Rywak.

FIGURE 4C shows a possible arrangement of the actuating units of FIGURE 3 when the electronic switches discussed above are used. The arrangement shown is also suitable for providing the correct actuating sequence for the switches of other embodiments of this invention. A clock pulse generator 85 is connected directly to an output terminal 100, and, through an inverting circuit 87, to an output terminal 101. The train of clock pulses is also supplied to a frequency dividing circuit 86 which produces an output pulse train having half the frequency of the input pulse train. The output of frequency divider 86 is connected to an output terminal 102 and, through an inverting circuit 88, to an output terminal 103.

Terminals 100 and 101 provide the appropriate pulse trains for connection to gating terminals 91 and 92 respectively of electronic switch per FIG. 4A to actuate an electronic switch in the sequence 1010. Reversal of the connections will provide the switching sequence 0101. Terminals 102 and 103 provide the switching sequencies 1100 and 0011 depending on the sense of the connections. By varying the frequency of the clock pulse generator 85, the frequency of the random binary pulse sequence can be controlled. The operation of the remaining portion of FIGURE 4C will be described below in connection with FIGURE 5.

In the embodiment of the invention described in conjunction with FIGURE 3 different pairs of consecutively stored voltages are compared. The principles of this invention, however, are applicable to random number generators in which the pairs of stored voltages which are compared are not immediately consecutively stored voltages or in which the same stored voltage is used for more than one comparison. As an example of the latter form of embodiment of this invention reference may be made to FIGURE 5 which shows a portion of a random number generator operating on a repetitive cycle of four time intervals T1 to T4 inclusive. FIG. 4C shows a timing circuit for controlling the operation of switches shown in FIG. 5.

Switches 108 through 111 are closed by actuating units 104 through 107 during time intervals T1 through T4, respectively, supplying samples of a random noise voltage to a capacitor array formed by capacitor pairs 26A and 26B, 27A and 27B, 28A and 28B, 29A and 29B. The capacitor pairs are supplied with the sampled noise voltage in parallel to each capacitor of the pair so that both capacitors store the same noise voltage.

The voltages stored on the capacitors are supplied in pairs to a comparison circuit 60 having input conductors 40 and 41 by a second switching tree formed by switches 120 through 135. The operation of these switches is controlled by actuating units 112 through 119 so that switches 120 and 121 are closed during intervals T3 and T4; switches 122 and 123 are closed during intervals T4 and T1; switches 124 and 125 are closed during intervals T1 and T2; switches 126 and 127 are closed during intervals T2 and T3; switches 128 and 129 are closed during interval T3; switches 130 and 131 are closed during interval T4, switches 132 and 133 are closed during interval T1 and switches 134 and 135 are closed during interval T2.

Pairs of switches 145 and 136, 146 and 137, 147 and 138, 148 and 139 which are controlled by actuating units 140 through 143 respectively, respectively connect capacitor pairs **27*b* and 28*a*, 28*b* and 29*a*, 29*b* and 26*a* and pairs 26*b* and 27*a* to ground during intervals T1 through T4 respectively so as to discharge the capacitor pairs which have been compared during the preceding intervals T4, T1, T2 and T3 respectively. The voltage comparator 60 is connected to a binary generator 59 having output terminals 46 and 47 so that when the voltage on input conductor 40 is positive with respect to the voltage on input conductor 41 comparator 60 generates a first output signal to control binary generator 59 to produce a binary one. When the voltage on conductor 40 is negative with respect to the voltage on conductor 41 comparator 60 generates a second output signal to control binary generator 59** to produce a binary zero.

Figure 5:
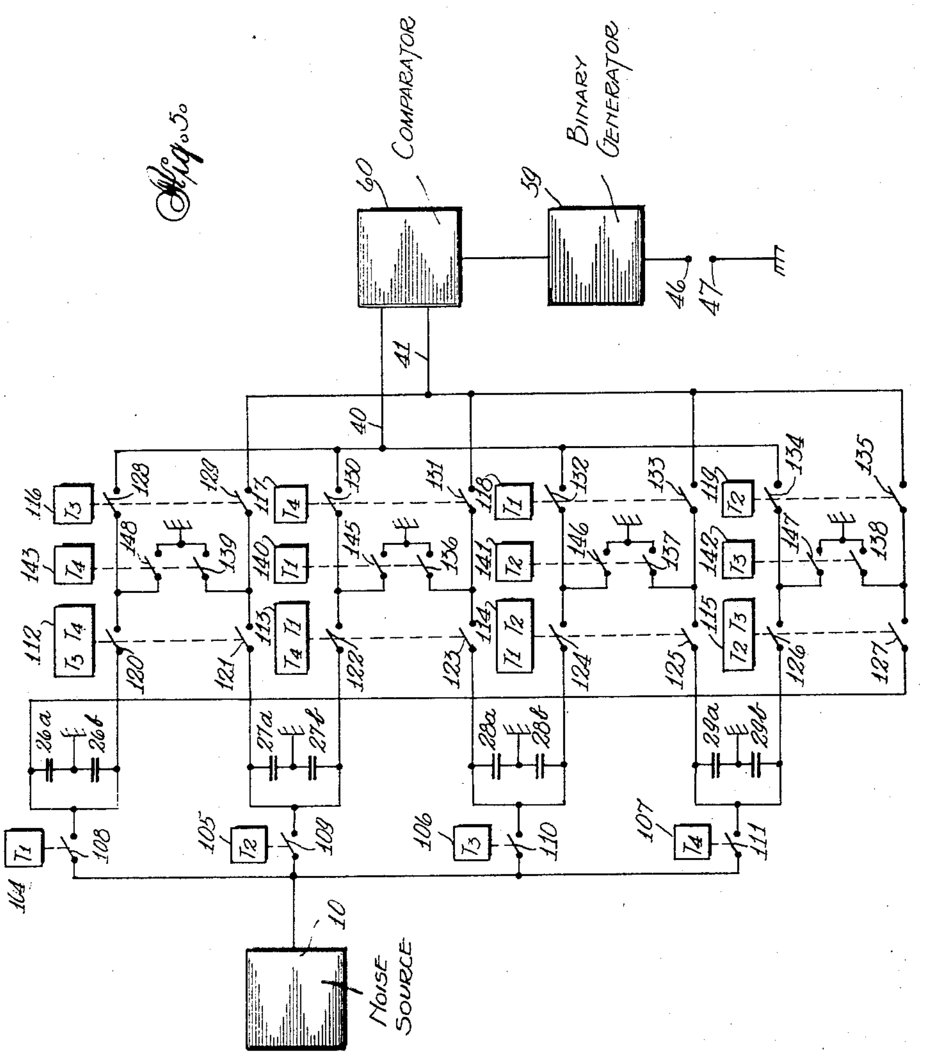
FIGURE 5 is a schematic diagram of a modification of the embodiment of FIGURE 3.

FIG. 4C shows an arrangement of logical AND and OR gates for producing the requisite pulse trains for energizing the actuating units of the switches shown in the embodiment of FIGURE 5. Terminals 104′ through 107′, 113′ and 115′ provide the appropriate excitation for switch actuators 104 through 107, 113 and 115 respectively. The correct excitation for switches 112 and 114 is available at terminals 103 and 102 respectively.

It is believed that the operation of that portion of the arrangement of FIGURE 4C not hitherto described is evident from the drawing. Terminals 104′ through 107′ each receive one pulse in every four from the clock pulse source 85. Terminal 115′ is energized when either of terminals 105′ or 106′ is energized, that is during intervals T2 and T3. Terminal 113′ is energized when either of terminals 104′ or 107′ is energized, that is during intervals T1 and T4.

In the operation of the random number generator shown in FIGURE 5 the noise voltage stored at the end of interval T1 is compared with the noise voltage stored at the interval T2, then a similar comparison is made with respect ot intervals T2 and T3, T3 and T4, T4 and T1 (of the subsequent cycle). After comparison of the stored voltages, the capacitors are discharged in readiness for the next charging cycle.

In the embodiments of the invention which have been described periodic equally spaced sampling of the noise waveform is used. In a random noise waveform there is no correlation between samples, except for closely spaced samples in a band-limited waveform. Accordingly in random number generators using the principles of this invention it is not necessary that the samples be equally spaced or that they be immediately consecutive.

Thus, there has been disclosed a binary random number generator in which the binary digit is determined by whether the sampled value of a random noise waveform at one instant exceeds or falls short of the sampled value at a subsequent instant. Since there is an equal probability for the difference between the two values to be positive or negative, the resulting sequence of binary numbers is random.

By the use of conventional binary-to-decimal conversion apparatus the sequence of binary random numbers produced by the system of this invention may be converted to numbers having the base ten. Similar means can be used for conversion to any other base. If required, the random number sequence produced may be used to prepare tables of random numbers.

The particular components used in the embodiments described may be replaced by equivalent components known to those skilled in the art, the embodiments disclosed being exemplary only.

We claim:

1. A binary random number generator comprising:
a source of wide-band noise voltage,
a first switching tree connected to said source to produce samples of said noise voltage,
a plurality of capacitors connected to said first switching tree for storing voltages representative of partially integrated values of said samples,
a second switching tree connected to said capacitors to produce sequentially selected pairs of voltages from the voltages stored on said capacitors,
a bistable circuit, having a first and second stable state, connected to said second switching tree responsive to each said selected pair of voltages to assume said first stable state when one of the selected pair of voltages is positive with respect to the other and to assume said second stable state when said one of the selected pair is negative with respect to the other, and
mean for discharging the capacitors storing a selected paid of voltages after said bistable circuit has responded to the selected pair.

2. A binary random number generator comprising,
a source of wide-band noise having a randomly fluctuating parameter,
a switching tree connected to said wide-band noise source producing samples of said signal,
storage means connected to said switching tree to retain values representative of said parameter for each of said samples,
a binary flip-flop selectively connected to said storage means to compare pairs of retained values and to generate a binary digit one when one of said pair of retained values is positive with respect to the other of said pair of retained values and to generate a binary digit zero when said one of said pair of retained values is negative with respect to said other of said pair of retained values.

3. A binary random number generator comprising,
a source of wide-band noise voltage having a randomly fluctuating amplitude,
a switching tree connected to said wide-band noise voltage source producing samples of said signal,
a plurality of capacitors connected to said switching tree to retain values representative of said noise voltage amplitude for each of said samples,
a comparison circuit connected to said capacitors to compare pairs of retained values and to provide a first output signal when one of said pair of retained values is positive with respect to the other of said pair of retained values and a second output signal when said one of said pair of retained values is negative with respect to said other of said pair of retained values, and
a binary signal generator connected to said comparison circuit and responsive to said first output signal to generate a binary digit one and responsive to said second output signal to generate a binary digit zero.

References Cited

UNITED STATES PATENTS

| | | | |
|---|---|---|---|
| 3,116,458 | 12/1963 | Margopoulos | 328—135 |
| 3,158,759 | 11/1964 | Jasper | 328—151 XR |
| 3,225,213 | 12/1965 | Hinrichs et al. | 307—235 |

ARTHUR GAUSS, *Primary Examiner.*

S. D. MILLER, *Assistant Examiner.*

U.S. Cl. X.R.

307—235, 254, 255, 260; 328—147, 151, 188; 331—78